United States Patent [19]

Takahashi

[11] Patent Number: 5,766,652

[45] Date of Patent: Jun. 16, 1998

[54] MEANS FOR HOLDING A STAMPER PLATE IN A MOLDING METAL DIE

[75] Inventor: Mitsuo Takahashi, Matsudo, Japan

[73] Assignee: Seiko Giken Co., Ltd., Matsudo, Japan

[21] Appl. No.: 678,082

[22] Filed: Jul. 10, 1996

[30] Foreign Application Priority Data

Nov. 17, 1995 [JP] Japan .................. 7-323931

[51] Int. Cl.$^6$ .................................. B29C 45/00
[52] U.S. Cl. .................. 425/190; 264/106; 264/107; 425/192 R; 425/810
[58] Field of Search .................. 425/190, 191, 425/192 R, 810; 264/106, 107

[56] References Cited

U.S. PATENT DOCUMENTS

| | | | |
|---|---|---|---|
| 4,737,096 | 4/1988 | Poorten | 425/190 |
| 4,961,884 | 10/1990 | Watanabe et al. | 425/810 |
| 5,297,951 | 3/1994 | Asai | 425/810 |
| 5,466,145 | 11/1995 | Takahashi | 425/190 |

FOREIGN PATENT DOCUMENTS

| | | |
|---|---|---|
| 0 177 991 | 4/1986 | European Pat. Off. . |
| 02 276610 | 11/1990 | Japan . |
| 02 276613 | 11/1990 | Japan . |
| 2-295726 | 12/1990 | Japan . |
| 2-60502 | 12/1990 | Japan . |
| 05 092449 | 4/1993 | Japan . |
| 05 269808 | 10/1993 | Japan . |
| 08 057908 | 3/1996 | Japan . |
| 08 057909 | 3/1996 | Japan . |

Primary Examiner—Tim Heitbrink
Attorney, Agent, or Firm—Spencer & Frank

[57] ABSTRACT

An apparatus for holding a stamper plate in a molding metal die is provided which comprises a cavity plate having a cavity center hole, a stamper plate press member having a flange portion larger than the stamper plate center hole, a vacuum evacuation device, a compressed air supply device, a first connecting device for connecting the cavity center hole to the vacuum evacuation device, and a second connecting device for connecting the cavity center hole to the compressed air supply device. The stamper plate is mounted by inserting the stamper plate press member within the cavity center hole and the stamper plate center hole, such that the flange portion is engaged on the upper surface of the stamper plate and a space is formed between the stamper plate press member and the cavity center hole. The vacuum evacuation device is then connected to the cavity center hole through the first connecting device, so that the stamper plate press member is sucked into the cavity center hole. The stamper plate is removed by connecting the cavity center hole to the compressed air supply device through the second connecting device, so that the stamper plate press member is pushed out of the cavity center hole. A device for sucking the stamper plate onto the surface of the cavity plate can also be added.

5 Claims, 2 Drawing Sheets

MEANS FOR HOLDING A STAMPER PLATE IN A MOLDING METAL DIE

BACKGROUND OF THE INVENTION

1. Field of the Invention

The present invention relates to a molding metal die for optical substrates such as CD-ROMs and the like. More specifically, the present invention relate to a means for holding a stamper plate in a molding metal die for injection molding optical disk substrates pursuant to the present invention a stamper plate can be easily mounted on and removed from a disk cavity plate surface in the molding metal die.

2. Description of the Related Art

An optical disk substrate injection molding metal die for moving a stamper plate press bush using a cam shaft is know in the prior art. Refer to, for example, Japanese Patent Application Laid-open No. H2-295726. FIG. 4 is a cross sectional view showing an injection molding state of a conventional optical disk substrate injection molding metal die for moving the stamper plate press bush using the cam shaft.

FIG. 5 is a schematic cross sectional view showing a state in which the stamper plate press bush is moved by the conventional apparatus. Note, although these drawings show that a fixed side molding metal die is located on an upper side, there are also cases in which the fixed side molding metal die is used laterally so that the center axis of a cavity is disposed horizontally and the position of the fixed side molding metal die is vertically reversed with respect to the above case.

A fixed side disk cavity plate 4 is disposed to a fixed side plate 6 and a hole 5 is defined at the center of the fixed side disk cavity plate 4 to receive a stamper plate press bush 2. A flange 3 having an outside diameter larger than the center hole of a stamper plate 1 is disposed at the lower end of the stamper plate press bush 2. Further, a cutout 9 is defined at the upper end of the stamper plate press bush 2. The fixed side plate 6 rotatably supports two engaging rods 7 to be engaged with the cutout 9 of the stamper plate press bush 2. These two engaging rods 7 have planes 8 each having a semi-circular cross section, and are connected to each other so as to rotate in synchronism. A spool bush 10 is inserted into the center hole of the stamper plate press bush 2 which has an injection hole 11 for molten resin at the center thereof. Ring-shaped cooling water passages 12 are disposed in the fixed side disk cavity plate 4 in contact with the fixed side plate 6.

A movable side disk cavity plate 17 is fixed to a movable side plate 19. A punch 18 is upward and downward movably supported at the center of the movable side disk cavity plate 17 to punch the center hole of a disk substrate.

When injection molding is effected, the stamper plate 1 is engaged with the stamper plate press bush 2 so that the outer periphery of the hole of the stamper plate 1 is pressed by the flange 3 of the stamper plate press bush 2. In injection molding, the stamper plate press bush 2 is engaged with the planes 8 of the semi-circular cross sections of the two engaging rods 7 and pressed thereby, as shown in FIG. 4.

Next, the steps for removing the stamper plate 1 will be described with reference to FIG. 5. A molded disk substrate member 20 is removed by opening the die. When the two engaging rods 7 are turned in the direction of the arrow as shown in FIG. 5, the planes 8 of the engaging rods 7 are disengaged from the cutout 9 of the stamper plate press bush 2 and pushes the upper surface of the stamper plate press bush 2. With this operation, the stamper plate press bush 2 is pushed out from the center hole 5 of the fixed side disk cavity plate 4, as shown in the drawing. Thus, the operator can take out the stamper plate 1 by hand while holding the stamper plate press bush 2.

Since the conventional example is a system for mechanically mounting and removing the stamper plate 1 by the stamper plate press bush 2, the stamper plate 1 can be securely mounted. However, since the above two rods 7 are used and a driving unit for driving them is needed, the following problems arise. The use of the two rods 7 and the provision of the driving unit for driving them disposed in relation to the molding metal die prevent the reduction of size and weight of the die. Further, the provision of the above rods 7 and driving unit in relation to the die restricts the design of the cooling water passages 12. Further, a certain degree of skill is required to mount and remove the stamper plate 1.

To solve the above problems, there is proposed an optical disk substrate injection molding metal die provided with a vacuum suction type stamper plate press unit. Refer to, for example, Japanese Patent Publication No. H2-60502. As shown in FIG. 3, concentric circular grooves 22 and 23 are defined around the central portion and outer peripheral portion of a stamper plate side disk cavity plate 21. These concentric circular grooves are connected to an external vacuum suction unit (not shown) through a communication hole 24.

A circumferential portion 27 to be inserted into the center hole of a stamper plate 25 is disposed at the extreme end of a cylindrical bush 26. A cylindrical bush 28 disposed at the center of the cylindrical bush 26 is a punch for punching the center hole of the stamper plate 25. A spool bush 30 is disposed at the center of a fixed side disk cavity plate 29. In the molding metal die arranged as described above, the stamper plate 25 can be simply removed from the stamper plate side disk cavity plate 21 by stopping the vacuum suction.

However, this type of apparatus also has a drawback. In the optical disk substrate injection molding metal die, the interior of the cavity is often filled with molten metal in the state that it is evacuated under vacuum to provide the density of the molten resin in the cavity with improved uniformity. In this case, however, since the rear surface of the stamper plate 25 and the cavity are evacuated to the same level, no suction force acts on the rear surface of the stamper plate 25. Therefore, there is a possibility that the stamper plate 25 will fall away from the cylindrical bush 26 from the vibration and impact of the molding machine operating at a high speed. Further, a vacuum pump must be operated as long as the stamper plate 25 is mounted even if the molding operation is interrupted.

An object of the present invention is to provide a means for holding a stamper plate in a molding metal die by a simple arrangement without employing a special support structure in the molding metal die and permitting the stamper plate to be easily replaced.

SUMMARY OF THE INVENTION

To achieve the above object, a means for holding a stamper plate in a molding metal die according to the present invention comprises a cavity center hole defined at the center of a cavity plate, a stamper plate press member including a flange portion having a portion larger than the center hole of the stamper plate at an end thereof and loosely inserted into the cavity center hole from the other end thereof, a vacuum evacuation device, a compressed air supply device, and switching/connecting means for switching and connecting the bottom of the cavity center hole to the vacuum evacuation device and the compressed air supply device. When the stamper plate is to be mounted, the stamper plate press member is inserted into the cavity center hole such that the other end of the stamper plate press member is inserted into the center hole of the stamper plate and a space between the other end and the cavity center hole is connected to the vacuum evacuation device by the switching/connecting means. When the stamper plate is to be removed, the space between the other end and the cavity center hole is connected to the compressed air supply device by the switching/connecting means to thereby push out the stamper plate press member.

DESCRIPTION OF PREFERRED EMBODIMENTS

Figure 1:
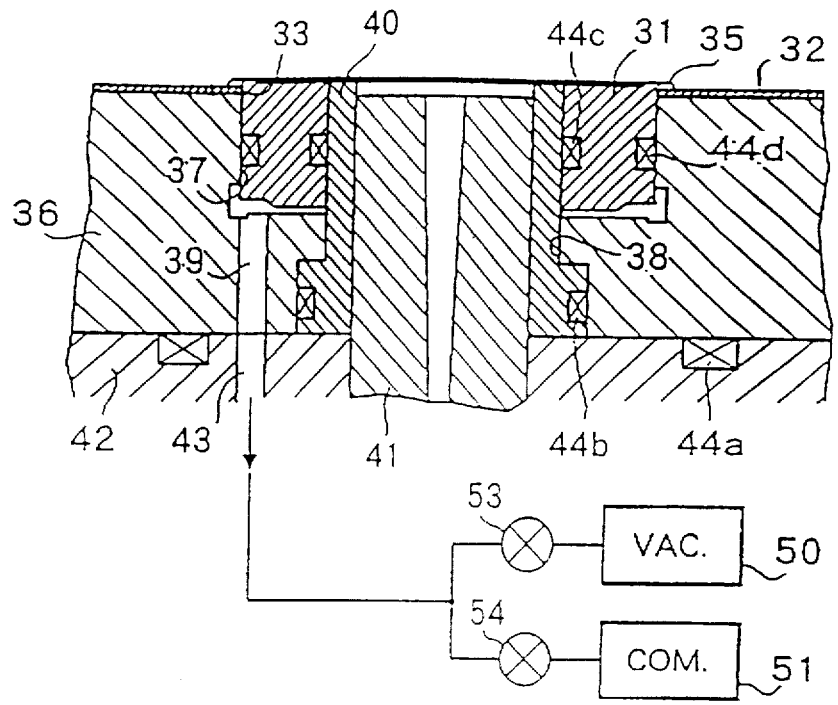
FIG. 1 is a cross sectional view showing a main portion of a first embodiment of an optical disk substrate injection molding metal die according to the present invention.

A means for holding a stamper plate in a molding metal die according to the present invention will be described in detail with reference to the drawings. FIG. 1 is a view schematically showing the cross section of a main portion of an optical disk substrate injection molding metal die using an embodiment of the means for holding the stamper plate in the molding metal die according to the present invention and an air pressure device. Information to be transferred is held on the upper surface of the stamper plate 32 in the drawing. A stamper plate press member 31 has an outside diameter to be accurately engaged with the center hole 33 of the stamper plate 32 as well as a flange portion 35 larger than the center hole 33 of the stamper plate 32 at the extreme end thereof.

A fixed side disk cavity plate 36 has a through hole 38 defined thereto which has a hole 37 for accurately and detachably receiving the stamper plate press member 31. Further, the fixed side disk cavity plate 36 has a hole 39 defined therein through which air is evacuated and supplied. A cylindrical cut bush 40 is a cut bush for punching the center hole of a disk substrate. A spool bush 41 is disposed at the center of the cylindrical cut bush 40.

A fixed side plate 42 has an externally connecting hole 43 defined thereto which corresponds to the air evacuation and supply hole 39. The externally connecting hole 43 is connected to a vacuum evacuation device 50 and a compressed air supply device 51 through connecting means 53 and 54, such as valves.

Note, numerals 44a–44d denote air tight seal members such as O rings and the like.

Next, a mechanism for mounting and removing the stamper plate 32 of an embodiment of the optical disk substrate injection molding metal die will be described. First, the stamper plate 32 is mounted in such a manner that the stamper plate press member 31 on which the stamper plate 32 is mounted is manually inserted into the hole 37 of the fixed side disk cavity plate 36. Continuously, the vacuum evacuation device 50 is operated by opening the connecting means 53 so that the air in the space of the hole 37 is evacuated though the externally connecting hole 43 as shown by an arrow and the pressure is instantly reduced to create a vacuum. Therefore, the stamper plate press member 31 is strongly sucked into the hole 37 of the fixed side disk cavity plate 36 and held thereby.

Next, the stamper plate 32 is removed in such a manner that when the compressed air supply device 51 is operated by opening the connecting means 54, the stamper plate press member 31 is pushed out from the center hole 37 of the fixed side disk cavity plate 36 by an air pressure. At that time, the operator can simply remove the stamper plate 32 by hand while supporting the stamper plate press member 31. Note, although a means for sucking the stamper plate 32 to the surface of the fixed side disk cavity plate 36 is not shown in this example, it may be separately formed as necessary.

Figure 2:
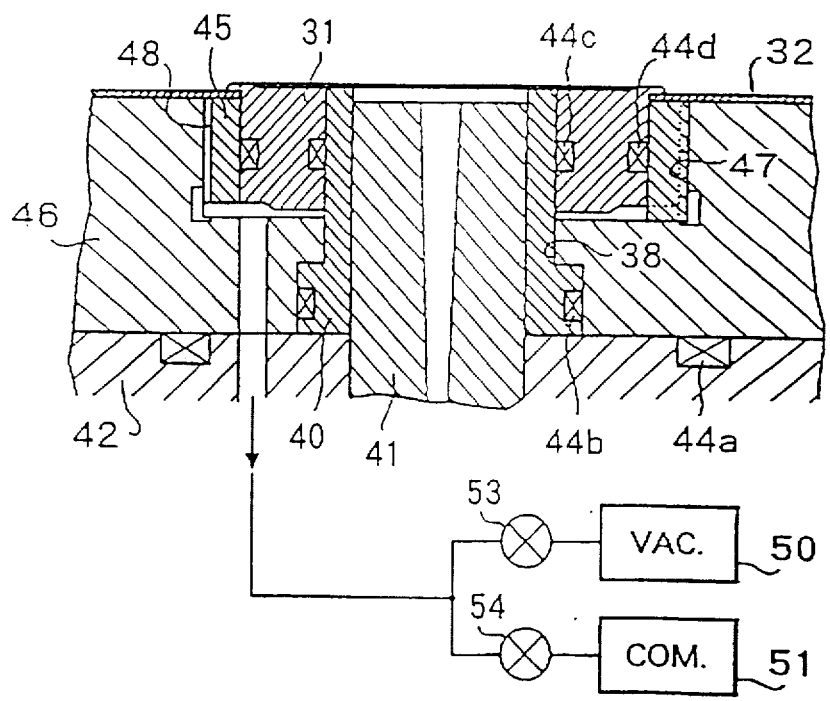
FIG. 2 is a cross sectional view showing a main portion of a second embodiment of an optical disk substrate injection molding metal die according to the present invention.

FIG. 2 schematically shows the cross sectional view of a main portion of an optical disk substrate injection molding metal die making use of a second embodiment of the means for holding a stamper plate in a molding metal die according to the present invention and an air pressure circuit. This embodiment is provided with a means for sucking a stamper plate 32 onto the surface of a disk cavity plate 46 in addition to a stamper plate press member 31. Since the main components of this embodiment are common to those of the aforesaid first embodiment, the common components are denoted by the same numerals as used in the embodiment 1 and the description thereof is omitted. A cylindrical member 45 for sucking the stamper plate has an inside diameter which can be accurately received by the outside diameter of the stamper plate press member 31.

Then, the outside diameter of the cylindrical member 45 has a plurality of stripe-shaped rim portions which are accurately engaged with the inside diameter of a center hole 47 and a portion for forming a multiplicity of arc-shaped interval portions 48 in a radial portion which is 0.02 mm or more smaller than the radius of the above center hole 47. The above rim portions are accurately engaged with the above center hole 47 to thereby form a suction passage.

Next, operation of the second embodiment of the optical disk substrate injection molding metal die will be described. First, the stamper plate press member 31 on which the stamper plate 32 is mounted is attached to the inner diameter surface of the cylindrical member 45 disposed in the center hole 47 of the disk cavity plate 46 by vacuum evacuation. At the same time, the air on the back surface of the stamper plate 32 and on the disk cavity plate 46 is evacuated by a vacuum evacuation device 50 from the above intervals 48 to thereby cause the stamper plate 32 to come into intimate contact with the surface of the disk cavity plate 46.

Note, the stamper plate 32 may be inserted into the center hole 47 of the disk cavity plate 46 after it is coupled with the stamper plate press member 31 and the stamper plate press member 31 is engaged with the cylindrical member 45.

The stamper plate 32 can be removed in such a manner that a compressed air supply device 51 is operated by actuating a valve of a connecting means 54 after a die is opened to thereby forcibly float the stamper plate press member 31 and the cylindrical member 45 at the same time. Then they are drawn out once and held.

Various modifications may be made within the scope of the present invention with respect to the embodiments described above in detail.

The optical disk substrate injection molding metal die using the means for holding the stamper plate in the molding metal die according to the present invention arranged as described above has the following advantages.

Figure 4:
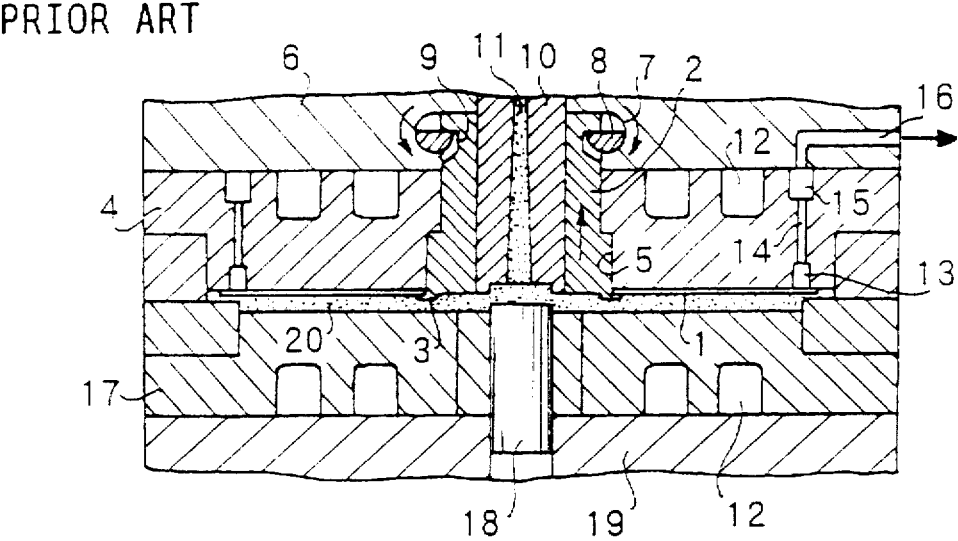
FIG. 4 is a cross sectional view showing an injection molding state of a conventional optical disk substrate injection molding metal die for moving a stamper plate press bush using a cam shaft.
Figure 5:
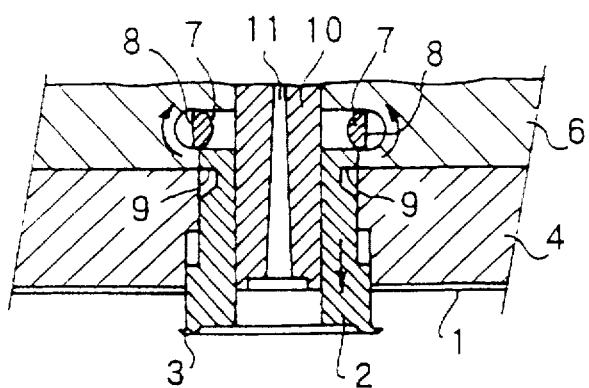
FIG. 5 is a schematic cross sectional view showing the state when the stamper plate press bush is moved by the conventional apparatus shown in FIG. 4.

The optical disk substrate injection molding metal die does not need an actuator driving mechanism as used in the conventional optical disk substrate injection molding metal die shown in FIG. 4 and FIG. 5. As a result, the reduction in the size and weight of the molding metal die can be achieved as well as a reduction in the number of components and a wider degree of freedom of design. Thus, an optical disk substrate injection molding metal die having better characteristics can be manufactured.

Figure 3:
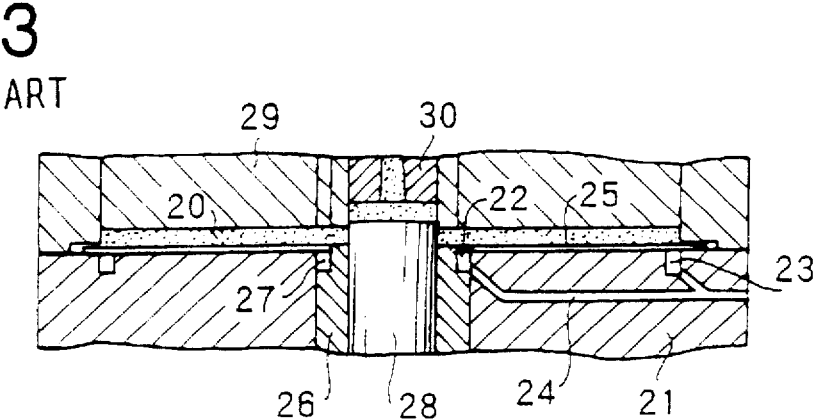
FIG. 3 is a cross sectional view showing a main portion of an embodiment of a conventional optical disk substrate injection molding metal die for pressing a stamper plate by vacuum evacuation.

The optical disk substrate injection molding metal die according to the present invention solves the problems of the removal of a stamper plate caused by vibration and the like which arise in the conventional optical disk substrate injection molding metal die shown in FIG. 3 employing only vacuum evacuation.

What is claimed is:

1. A means for holding a stamper plate having a stamper plate center hole and an upper surface, in a molding metal die, said means comprising:

a cavity plate having a cavity center hole;

a stamper plate press member having a first end, a second end, a flange portion at the first end larger than the stamper plate center hole, and an outside diameter for engagement with the stamper plate center hole and the cavity center hole;

a vacuum evacuation device;

a compressed air supply device;

a first connecting means for connecting the cavity center hole to said vacuum evacuation device; and a second connecting means for connecting the cavity center hole to said compressed air supply device;

wherein, the stamper plate is mounted by inserting said stamper plate press member within the cavity center hole and the stamper plate center hole, such that said flange portion is engaged on the upper surface of the stamper plate and a space is formed between said stamper plate press member and the cavity center hole, and by connecting said vacuum evacuation device to the cavity center hole through the first connecting means, whereby said stamper plate press member is sucked into the cavity center hole; and wherein, the stamper plate is removed by connecting the cavity center hole to said compressed air supply device through the second connecting means, such that the stamper plate press member is pushed out of the cavity center hole.

2. A means for holding a stamper plate in a molding metal die according to claim 1, wherein the stamper plate has an upper surface on which information is contained and the stamper plate is positioned such that the upper surface is horizontal.

3. A means for holding a stamper plate in a molding metal die according to claim 1, wherein the stamper plate has an upper surface on which information is contained and the stamper plate is positioned such that the upper surface is vertical.

4. A means for holding a stamper plate, having a stamper plate center hole, an upper surface and a lower surface, in a molding metal die, said means comprising:

a cavity plate having a cavity center hole;

a stamper plate sucking cylindrical member having an inner diameter, an outer periphery, a first end, a second end, a center axis, and a stamper plate sucking air passage forming portion defined around the outer periphery and parallel to the center axis;

a stamper plate press member having a first end, a second end, a flange portion at the first end larger than the stamper plate center hole, and an outside diameter for engagement with the inner diameter of the stamper plate sucking cylindrical member;

a vacuum evacuation device;

a compressed air supply device;

a first connecting means for connecting the cavity center hole to said vacuum evacuation device; and a second connecting means for connecting the cavity center hole to said compressed air supply device;

wherein, the stamper plate is mounted by positioning said stamper plate press member within the stamper plate center hole and the inner diameter of the stamper plate sucking cylindrical member, such that said flange portion is engaged on the upper surface of the stamper plate, and by positioning said stamper plate sucking cylindrical member within the cavity center hole, such that the first end of said stamper plate sucking cylindrical member is adjacent to the lower surface of the stamper plate and a space is formed between the stamper plate press member, the stamper plate sucking cylindrical member, and the cavity center hole, and by connecting said vacuum evacuation device to the cavity center hole through the first connecting means, whereby said stamper plate is brought into intimate contact with said cavity plate; and wherein, the stamper plate is removed by connecting the cavity center hole to said compressed air supply device through the second connecting means such that said stamper plate press member and said stamper plate sucking cylindrical member are pushed away from the cavity center hole.

5. A means for holding a stamper plate in a molding metal die according to claim 4, wherein said stamper plate sucking air passage forming portion has a radial length of at least 0.02 mm.

* * * * *